Feb. 16, 1932.   H. G. WEYMOUTH   1,845,464
COMPOUND FLUID METER
Filed March 1, 1928
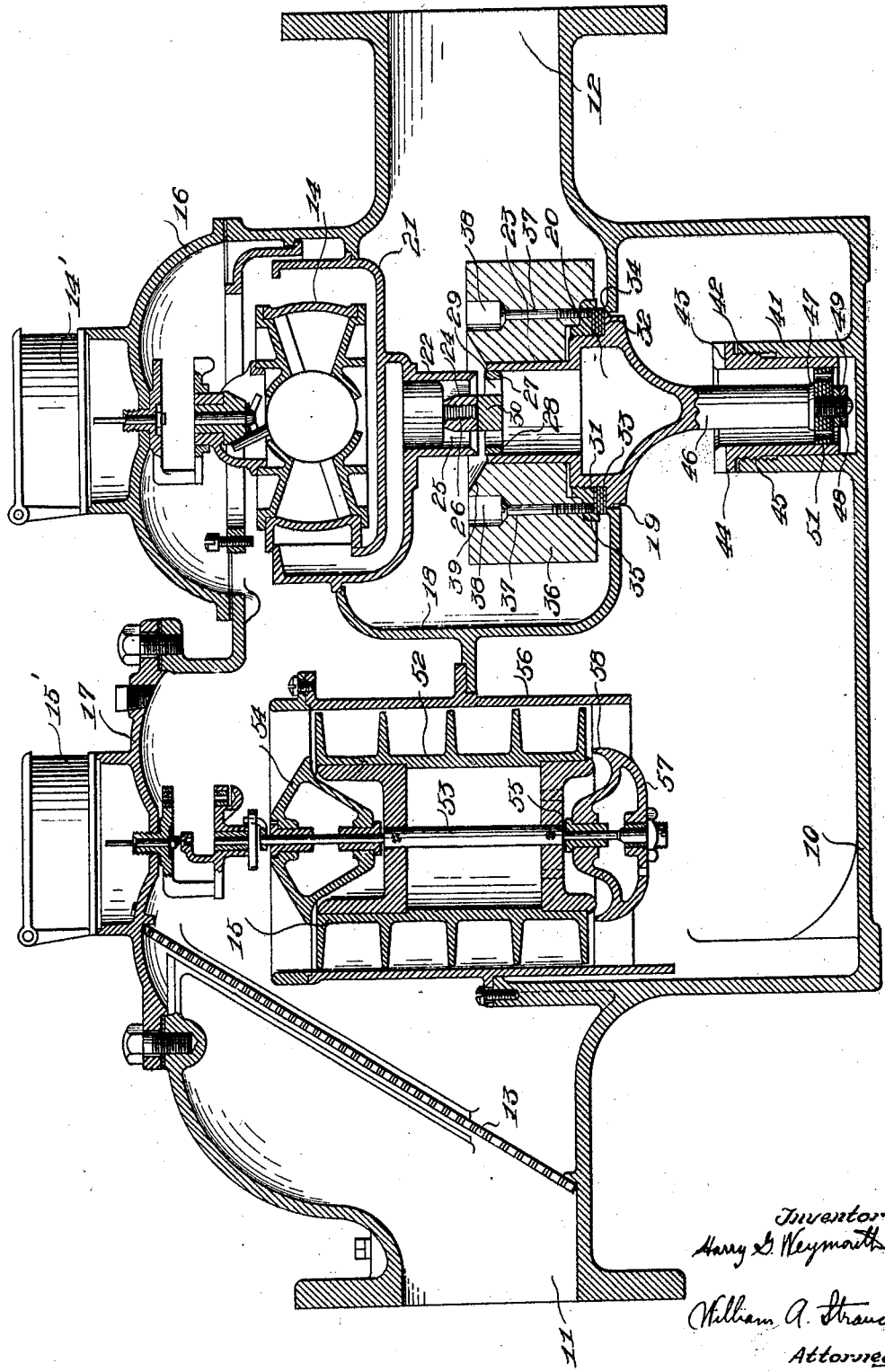
Inventor
Harry G. Weymouth
William A. Strauch
Attorney Patented Feb. 16, 1932

1,845,464

UNITED STATES PATENT OFFICE

HARRY G. WEYMOUTH, OF PITTSBURGH, PENNSYLVANIA, ASSIGNOR TO PITTSBURGH EQUITABLE METER COMPANY, OF PITTSBURGH, PENNSYLVANIA

COMPOUND FLUID METER

Application filed March 1, 1928. Serial No. 258,301.

This invention relates to fluid meters, and more particularly to that class of meters known as compound fluid meters comprising two meters adapted to come into operation successively, one meter adapted to register the lighter flows and the other meter adapted to register the heavier flows, the sum of the registrations of the two meters representing the total amount of water passed through the compound meter.

Compound meters of the character mentioned provided with differential pistons for operating the main control valve, such as disclosed in the patent to Horace Chrisman 1,286,942, December 10, 1918, have been successfully employed. In this type of meter the differential piston is open to the atmosphere on one side and in some instances leaks develop in operation due to the scoring of the piston and adjacent cylinder walls caused by grit and like substances which are carried by the fluid and in some cases this leakage is considered undesirable for instance where the meter is installed on one of the floors of a store. A substantial demand, however, exists for this type of meter.

In order to avoid such leakage it has been proposed to employ differential pistons not open to the atmosphere, but such constructions are complicated, excessive in size, expensive, and difficult to keep tight at the joints.

A primary object of my invention is to provide novel compound meter constructions in which leakage is eliminated.

Because of the existing demand for meters operated by differential pistons such as shown in said patent numbered 1,286,942, a further object of my invention is to provide a compound meter embodying a novel valve construction and control arrangement that is accurate and sensitive in operation and is readily interchangeable with differential piston operated valve constructions of the type shown in said patent, whereby the manufacturing costs of a meter casing adapted to embody both types of meters may be reduced because of the standardized parts in this way utilized.

In carrying forward my invention, a weighted valve structure is preferably utilized. Weighted control valves in meters have heretofore been used, but such proposed constructions have been unsatisfactory due to the fact that the valves tend to chatter or pulsate and due to their unstable equilibrium at the cross over point from one meter to the other wear rapidly. Accordingly a further object of my invention is the provision of a weighted valve construction for compound meters adapted upon a heavy draft on the system to stop the flow through one meter and cause the flow through the other meter, without permitting substantial valve chatter and the causation of resulting pulsations in a water line and the usual rapid wear and deterioration of the meter parts.

A still further object of my invention is the provision of a valve construction adapted to control the flow through the two meters of a compound meter, which is of such construction as to minimize leakage, wear of parts, and vibrations or chatter.

The foregoing, together with such other objects as may hereinafter appear, or are incident to my invention, I attain by means of a construction, a preferred form of which is illustrated in the accompanying drawing, wherein:

The figure is a longitudinal section through the meter.

Referring now to the drawing.

The meter comprises a main casing 10, provided with an inlet opening 11 and a discharge opening 12. Mounted within the casing 10 adjacent the inlet opening 11 is a suitable screen 13 adapted to remove the solid matter which might otherwise interfere with the operating mechanism of the meters. Arranged within the casing 10 are the meters 14 and 15, the registering and indicating mechanism 14' of meter 14 being carried by a removable cover plate 16 and the registering and indicating mechanism 15' of meter 15 being carried by a removable cover plate 17.

Disposed in casing 10 is a partition 18 which in conjunction with the casings of the meters 14 and 15 divides the casing 10 into two compartments, communication between which is established through meter 14 and by means of the orifice 19 in the lower portion of wall 18, which is controlled by the valve 20.

It will thus be seen that the casing provides in effect a common conduit having an inflow connection and an outflow connection with two separate branches connecting them, with a meter for registering flow through each branch.

The operating mechanism of the meter 14 is of the well known nutating disk type, and its main casing 21 terminates in a hollow cylindrical outlet member 22.

The upper portion of the valve 20 terminates in a tubular cylindrical member 23, the inside diameter of which is equal to the external diameter of the cylindrical member 22. Cylindrical member 22 is provided with a centrally disposed internally threaded boss 24 rigidly supported therein by means of a spider formation 25. Detachably secured to the boss 24 by means of threaded extension 26 is a guide member 27 comprising a cylindrical portion 28 accurately fitting within the tubular cylindrical extension 23 of valve 20 and connected by means of ribs 29 to a central hub portion 30 with which threaded extension 26 is integrally formed.

The valve 20 as illustrated is of a hollow formation and is provided with an externally threaded cylindrical section 31 of greater diameter than cylindrical extension 23 and disposed adjacent thereto. The lower end of the cylindrical portion 31 terminates in a shoulder 32. Surrounding cylindrical portion 31 and in engagement with the shoulder 32 is a suitable gasket or valve seat member 33 the outer edges of which project beyond the outer edge of shoulder 32 and accurately contact with the valve seat 34 adjacent the orifice 19. Threadedly engaged with the cylindrical portion 31 is a securing ring member 35 which is adapted to be screwed down to bind gaskets 33 between it and shoulder 32.

Resting upon the ring member 35 and surrounding the cylindrical member 23 is a weight 36 which is detachably secured to the ring member 35 by means of screws 37 extending partially thru the weight and threaded into the ring, the heads of the screws being accessible thru counter sunk openings 38 in the top of the weight.

As shown the upper end of cylindrical member 23 is in relatively close spaced relation to the lower end of cylindrical member 22 when the valve 20 is seated and the central opening in the weight 36 is outwardly flared as indicated at 39 in order to maintain the opening between the adjacent ends of cylindrical valve members 22 and 23 respectively to permit free flow of fluid from meter 14.

Projecting upwardly from the bottom of casing 10 in axial alinement with cylindrical members 22 and 23 is a tubular cylindrical member 41 the upper end of which is internally threaded as indicated at 42. Seated within the cylindrical member 41 is an open ended cylindrical member 43 which is provided with an upper flange 44 and externally threaded adjacent thereto as indicated at 45 adapted to cooperate with the threads 42.

Formed integrally with, and projecting downwardly from valve 20 is a stem 46 which terminates in a shoulder 47 and extending downwardly from the shoulder is a threaded extension 48. Surrounding extension 48 and held in engagement with shoulder 47 by means of nuts 49 screwed onto projection 48 is one or more perforated disks 51 having their perforations aligned and which slidably fit into the bore of cylinder 43 in such a manner that cylinder 43 and disks 51 provide a dash pot arrangement.

The operating mechanism for meter 15 is of well known form and comprises a rotary propeller mechanism 52 mounted on shaft 53 which in turn is supported in bearings 54 and 55 adjacent the upper and lower ends. Bearing 55 is supported in a bearing block or housing 57 preferably formed integrally with the casing 56. Bearing block 57 is provided with an annular lip 58 which as shown, is curved upwardly and arranged so as to direct a portion of the water running downwardly through the propeller mechanism 52 upwardly against the bottom of the propeller. By this arrangement the propeller mechanism is subjected to opposite pressures which are more or less equalized, as a result of which the bearing 55 is relieved of the greatest part, if not all, of the downward thrust; the lip 58 as shown terminates in a sharp edge adapted to secure maximum efficiency.

*Operation*

The operation of the meter as thus far described is as follows:

When the draft on the system is light and the flow of fluid through the main is small, the valve 20 due to the weight 36 is held firmly on its seat, and the small flows of fluid that take place, pass from the inlet opening 11 directly through the meter 14, cylindrical valve member 22 and from the open end thereof out thru the outlet opening 12.

When there is a heavy or abnormal draft on the system, the valve 20 opens due to the reduction of pressure adjacent the outlet 12 and the upward pressure on valve 20 and cylindrical member 23 carried by valve 20 telescopes over the open end of cylindrical valve member 22 stopping the flow through the meter 14. The flow now takes place from the inlet 11 through the large meter 15, orifice 19 which has been opened by the unseating of valve 20 and out through the outlet 12. Each meter 14 and 15 when individually in operation registers the amount of flow by means of the respective indicating mechanism 14' and 15', the total readings of which represent the total amount of water passed through the compound meter.

By the provision of the outwardly flared portion 39 in the top of weight 36 the water is permitted to flow freely from the bottom of cylindrical member 22 when meter 14 is in operation and at the instant the upper end of the cylindrical valve member 23 engages the lower end of cylindrical member 22 the flow through meter 14 is instantly stopped simultaneously with which the flow takes place through meter 15.

By means of the guide member 27 and the disks 51 the valve 20 is accurately guided in its reciprocating movements which insures an accurate and firm seating of the valve gaskets 33 on the valve seat 34 as well as an equal distribution of water between the orifice 19 and valve 20 and it will accordingly be seen that a weighted valve in combination with a dash pot and guide construction for compound meters has been provided to control the flow through the two meters that is accurate and sensitive in operation, not subject to leakage and that minimizes chattering, pulsations and wear.

Another important feature of my improved valve and control construction is that it can readily be interchanged with valves of the differential piston type meter shown in Patent 1,286,942. That is, a standard compound meter housing may be manufactured to receive both types of valves, either by forming the housing as shown in said patent with the differential chamber vented, or by forming it with a closed dashpot chamber as in the present application. In the former event, should it be desired to insert the present valve 20 and its associated parts instead of the patentee's valve C and associated parts, it would merely be necessary to plug up the differential vents; and in the latter event, should it be desired to utilize the patentee's valve arrangement instead of that here shown and described, it would merely be necessary to provide vents in the dash chamber.

Having set forth one of the specific embodiments of my invention, it is to be understood that my invention is not limited to such details, but is to be limited only by the terms of the appended claims.

Accordingly, what is desired to be secured by Letters Patent, and claimed as new is:—

1. A compound fluid meter comprising a casing having a plurality of chambers, said casing including a ported wall for establishing communication between said chambers, a meter in said casing for registering light flows of fluid between said chambers, a valve controlling the flow of fluid through said ported wall, a tubular discharge member carried by said meter, a spider within the tubular member, a guide removably and adjustably carried by said spider and spaced from said tubular member, a member carried by said valve contacting with said guide and adapted to telescope said tubular member when said valve opens to check the flow through said meter; and a second meter adapted to register the heavier flows of fluid between said chambers when said valve is open.

2. A compound fluid meter comprising a casing having a plurality of chambers; a ported partition in said casing establishing communication between said chambers; a meter in said casing for registering the lighter flows of fluid between said chambers, a normally closed valve controlling the flow of fluid through said ported partition; a second meter in said casing for registering the heavier flows of fluid between said chambers; said valve adapted when open to check the flow of fluid through said first meter and allow a flow of fluid through said second meter, said valve comprising a hollow member defining cylindrical members of unequal diameters and a shoulder at the base of the cylindrical member of greater diameter; a seating member supported on said shoulder, a ring threadedly engaging said last cylindrical member in engagement with said seating member, a weight surrounding said cylindrical member of lesser diameter and resting on said ring and means extending through said weight and into said ring to detachably connect said weight to said ring.

3. In a compound fluid meter, a casing provided with a plurality of chambers, an apertured partition in said casing establishing communication between said chambers, a meter in said casing for registering the lighter flows of fluid between said chambers, said meter provided with a fluid conducting cylindrical member; a normally closed valve construction for controlling the flow of fluid through said apertured partition, said valve construction comprising a tubular member normally spaced from said member, guiding means associated with said members, a weight supported by said valve construction, said tubular member of said construction adapted to telescope said cylindrical member upon opening of said valve to check the flow through said meter, and said weight and cylindrical member each having a frustro-conical surface, a second meter in said casing for registering the heavier flows of fluid between said chambers when said valve is open, and cooperating means carried by said casing and said valve for dampening the movements of said valve.

4. In a compound fluid meter, a casing; a partition in said casing dividing said casing into compartments; a meter in said casing for registering the lighter flows of fluid between said compartments, a ported valve seat in said partition; a cylindrical fluid conducting member carried by said meter in vertical alinement with said valve seat; a normally closed valve construction controlling said valve seat, said valve construction comprising a seating member; a cylindrical member extending outwardly from said seating member normally spaced from said first cylindrical member, and a weight supported on said seating member and surrounding said second cylindrical member; said weight provided with an outwardly flared portion to provide for a normal fluid passage between said cylindrical members; said cylindrical members adapted to telescope upon opening of said valve to check the flow of fluid through said meter; a second meter in said casing adapted to come into operation and register the heavier flows of fluid between said compartments when said valve is open; and means for guiding and dampening the movement of said valve.

5. In a compounded meter arrangement, a common conduit having two separate branches, an inflow connection and an outflow connection both of which are common to both of said branches, a meter for registering the heavier flows, a weighted valve member, said meter and valve member being arranged in series in one of said branches, a second meter arranged in the other of said branches for registering the lighter flows, a tubular outlet member disposed in series with said second meter at a point adjacent said weighted valve member, said valve member being provided with means for telescoping said tubular member and being frustro-conically depressed adjacent said telescoping means, and a device cooperating with said weighted valve member to dampen the movement thereof.

In testimony whereof I affix my signature.

HARRY G. WEYMOUTH.